United States Patent [19]

Taylor et al.

[11] Patent Number: 5,663,266
[45] Date of Patent: Sep. 2, 1997

[54] WATERBORNE COATING COMPOSITIONS

[75] Inventors: James W. Taylor; James R. Salisbury, both of Kingsport, Tenn.

[73] Assignee: Eastman Chemical Company, Kingsport, Tenn.

[21] Appl. No.: 420,542

[22] Filed: Apr. 12, 1995

[51] Int. Cl.$^6$ .................. C08F 220/10; C08F 220/34; C08F 220/36; C08L 67/07
[52] U.S. Cl. ............... 526/325; 524/542; 524/55; 524/558; 526/281; 526/310; 526/320; 526/321; 526/323; 526/323.2; 526/324; 526/329; 526/329.2; 526/329.7; 526/909
[58] Field of Search ................ 526/316, 321, 526/323, 323.2, 325; 524/555, 558, 542

[56] References Cited

U.S. PATENT DOCUMENTS

| | | |
|---|---|---|
| 3,261,796 | 7/1966 | Slimms . |
| 3,356,627 | 12/1967 | Scott . |
| 3,607,834 | 9/1971 | Marx . |
| 4,421,889 | 12/1983 | Braun et al. ............. 524/381 |
| 5,227,423 | 7/1993 | Ingle ........................ 524/458 |
| 5,296,530 | 3/1994 | Bors ......................... 524/558 |
| 5,326,814 | 7/1994 | Biale ........................ 524/555 |

FOREIGN PATENT DOCUMENTS

| | | |
|---|---|---|
| 390370 | 10/1990 | European Pat. Off. . |
| 442653 | 8/1991 | European Pat. Off. . |
| 552469 | 7/1993 | European Pat. Off. . |
| 599478 | 1/1994 | European Pat. Off. . |
| 584916 | 2/1994 | European Pat. Off. . |

*Primary Examiner*—Fred Zitomer
*Attorney, Agent, or Firm*—Bernard J. Graves, Jr.; Rose M. Allen; Harry J. Gwinnell

[57] ABSTRACT

This invention provides latex compositions prepared using, for example, both acetoacetoxyethyl methacrylate (AAEM) and t-butylaminoethyl methacrylate (t-BAMA) which when applied to a pre-coated substrate, possess out-standing wet adhesion when compared to waterborne polymers containing either AAEM or t-butylaminoethyl methacrylate alone. The latex compositions of this invention continue to exhibit superior wet adhesion after storage at room temperature for one year. The latex compositions are thus particularly useful in coating compositions, especially coating bare or previously-coated metals, paper, plastics, wood, textiles, and in adhesives.

33 Claims, No Drawings

WATERBORNE COATING COMPOSITIONS

FIELD OF THE INVENTION

This invention belongs to the field of latex coatings. In particular, this invention provides a latex coating composition which, when applied to a substrate, exhibits superior wet adhesion properties.

BACKGROUND OF THE INVENTION

The term "wet adhesion" is used to describe the ability of a paint coating to retain its adhesive bond to a substrate under wet conditions. Good wet adhesion is well known in oil-based paints, but water-based paints tend to lose adhesion when wet. This inherent deficiency limits the usefulness of latex paints, especially vinyl-acrylic and all-acrylic latexes which are otherwise very attractive as paint vehicles.

Paints intended for outdoor use are frequently exposed to moisture due to rain and high humidity. Similar conditions are also encountered by interior paints used in bathrooms and kitchens. Furthermore, resistance to washing and abrasive scrubbing is also an important requirement for painted surfaces which become soiled and must be cleaned.

The property of wet adhesion to pre-coated substrates has been a highly desired property for water-borne acrylic or vinyl-acrylic polymers in architectural coatings markets. Amines were first used for wet adhesion in the early 1960's. U.S. Pat. No. 3,261,796 showed that carboxylic acid-containing latexes could be functionalized with amines by reacting the carboxylic acid group with the very toxic compounds, aziridines.

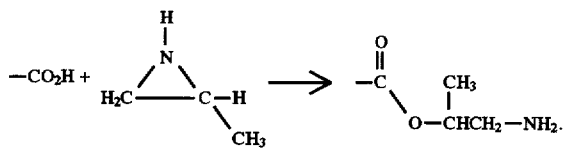

U.S. Pat. No. 3,356,627 teaches that dialkyl and monoalkylaminoethyl methacrylates and acrylates impart wet adhesion to coatings:

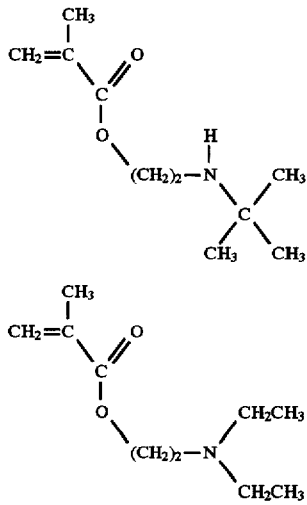

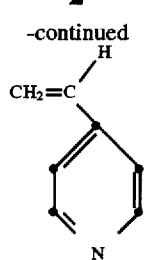

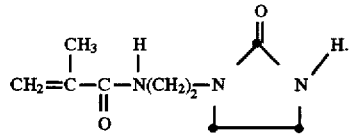

U.S. Pat. No. 4,421,889 describes the use of paints with improved wet adhesion using polymers containing derivatives having the acetoacetate functionality. In particular, this reference discloses the use of acetoacetoxyethyl methacrylate (AAEM) in polymers to improve wet adhesion of paints after a drying period of 24 hours. This reference does not teach the use of amino methacrylates. This reference further teaches that dispersion paints containing amino groups have a tendency to become yellow, and that their presence only slightly improves the wet adhesion of paints.

U.S. Pat. No. 5,326,814 teaches the use of ethylenureido-containing monomers in combination with acetoacetoxy-containing monomers and/or cyanoacetoxy-containing monomers, in combination with copolymerizable surfactants, olefinic carboxylic acid monomers, and a combination of hard and soft monomers.

When a paint is applied to a substrate, it is susceptible to losing its adhesion if high moisture conditions are present prior to the development of a wet adhesion property. The time it takes for coatings to develop wet adhesion is as important as the final wet adhesion property itself. We have found that paints prepared from polymers which contain, for example, polymerized acetoacetoxyethyl methacrylate (AAEM) and t-butylaminoethyl methacrylate (t-BAMA) monomers in addition to other ethylenically unsaturated monomers develop outstanding wet adhesion within five hours. Polymers containing only AAEM as a wet adhesion monomer produced no detectable wet adhesion within 5 hours, and a very slight improvement in wet adhesion after 24 hours. Polymers containing only amino-functional monomers, e.g., t-BAMA, as a wet adhesion monomer produced coatings with some wet adhesion in 5 hours, but this composition was found far inferior to latexes containing polymers prepared from both AAEM and t-BAMA. When formulated into paints, and stored for one year before application, compositions containing AAEM and t-BAMA continued to give wet adhesion.

SUMMARY OF THE INVENTION

The present invention provides latex coating compositions comprising a polymer prepared from a combination of olefinically unsaturated monomers having acetoacetoxy functionality and monomers having free amino groups. Preferred monomers include AAEM and t-BAMA. The wet adhesion to a substrate of coatings thus prepared is superior to the wet adhesion to a substrate of coatings prepared from polymers containing either monomer type alone.

DETAILED DESCRIPTION OF THE INVENTION

The present invention provides a polymer having one or more pendant side chains attached thereto, wherein at least one of said side chains contain an acetoacetoxy group, wherein said group has optionally been treated with ammonia or a primary or a secondary amine to provide an enamine moiety; and wherein at least one of said side chains contains an alkylamino or a dialkylamino group.

In a preferred embodiment, the present invention provides a polymer prepared by the free-radical polymerization of ethylenically unsaturated monomers comprised of (a) from about 0.5 to about 25 weight percent of a compound of Formula (1)

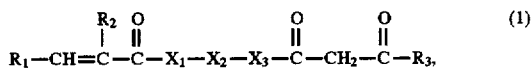

wherein $R_1$ is hydrogen or halo; $R_2$ is hydrogen, halo, $C_1-C_6$ alkylthio, or $C_1-C_6$ alkyl; $R_3$ is $C_1-C_6$ alkyl; $X_1$ and $X_3$ are independently O, S, or a group of the formula —NR', wherein R' is hydrogen or $C_1-C_6$ alkyl; and $X_2$ is $C_1-C_{12}$ straight or branched alkylene or $C_3-C_{12}$ cycloalkylene;

(b) from about 0.5 to about 25 weight percent of a compound of Formula (2),

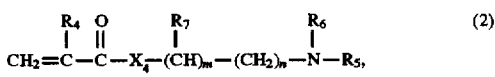

wherein $R_4$ is hydrogen or $C_1-C_6$ alkyl, $R_5$ is $C_1-C_6$ alkyl, $R_6$ is hydrogen or $C_1-C_6$ alkyl, $R_7$ is hydrogen or $C_1-C_6$ alkyl, m is an integer of from 1 to 4, n is an integer of from 1 to 4, and n+m is greater than or equal to 2, and $X_4$ is O, S, or a group of the formula —NR', wherein R' is hydrogen or $C_1-C_6$ alkyl; and (c) any remaining monomers selected from ethylenically unsaturated monomers of a structure other than Formula (1) or (2), the total weight percent of (a), (b), and (c) being 100 percent.

The preferred polymers of the present invention, when applied to a substrate coated with an aged alkyd to form a coating, exhibit wet adhesion within a period of 5 hours, wherein said wet adhesion is determined by exhibiting at least 1000 number of double scrubs resulting in a failure rate of said coating of 10% or less, wherein said coating is allowed to air dry after application, scored with a razor, submerged in water for 30 minutes, and subsequently scrubbed with a Nylon scrub brush (WP 2000NB) in a solution of said water, wherein said water has been treated with twenty grams of 5% (wt. %) of LAVA™ (Colgate-Palmolive) soap slurry.

It is preferred that compounds of Formulae (1) and (2) are used in a range of about 0.5 to 17 weight percent, more preferably from about 0.5 to 12 weight percent, most preferably about 1 to 4 weight percent.

Preferred compounds of Formula (1) include acetoacetoxyethyl methacrylate, acetoacetoxyethyl acrylate, acetoacetoxy(methyl)ethyl acrylate, acetoacetoxypropyl acrylate, and acetoacetoxybutyl acrylate. An especially preferred compound of Formula (1) is acetoacetoxyethyl methacrylate (AAEM). Such compounds provide a polymer with pendant acetoacetoxy groups which may optionally treated with ammonia or a primary or secondary amine to provide an enamine group as taught in EP 492 847.

Preferred compounds of Formula (2) include t-butylaminoethyl methacrylate, N,N-dimethylaminoethyl methacrylate, N-dimethylaminopropyl methacrylamide, 2-t-butylaminoethyl methacrylate, and N,N-dimethylaminoethyl acrylate. Especially preferred compounds of Formula (2) include t-butylaminoethyl methacrylate and N,N-dimethylaminoethyl methacrylate.

In the above polymers, additional ethylenically unsaturated species which can be utilized include, for example, methyl acrylate, methyl methacrylate, ethyl acrylate, ethyl methacrylate, isopropyl acrylate, isopropyl methacrylate, butyl acrylate, butyl methacrylate, isobutyl acrylate, isobutyl methacrylate, ethylhexyl acrylate, ethylhexyl methacrylate, octyl acrylate, hydroxyethyl methacrylate, alkenyl aromatic compounds (e.g., styrene, α-methyl styrene, vinyl naphthalene, and the like), vinyl compounds (e.g., vinyl esters such as vinyl acetate, vinyl propionate, vinyl chloride, vinyl neodecanoate, and the like), multifunctional acrylate and multifunctional methacrylate compounds (e.g., trimethylolpropane triacrylate and the like), di-n-butyl maleate, and compounds of the general formula (3)

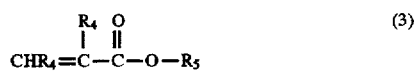

wherein $R_4$ is independently hydrogen or methyl and $R_5$ is $C_1-C_{12}$ alkyl.

Preferred ethylenically unsaturated compounds include the following:

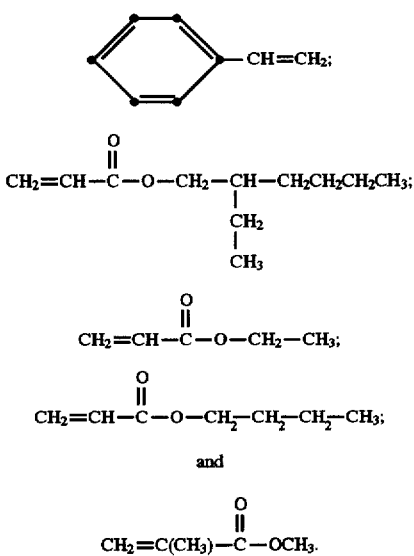

In the above formulae, the alkyl and alkylene groups may be straight or branched chain.

The polymers may further be prepared from known wet adhesions promoting monomers, including methacrylamidoethylethyleneurea and/or N-(2-methylacryloyloxyethyl) ethylene urea.

This invention provides a composition, a process, and end uses for water-borne polymers containing polymerized compounds of Formula (1), for example AAEM, and any amine-functional ethylenically-unsaturated monomer in addition to the other ethylenically unsaturated monomers. The examples below show the preparation of AAEM- and t-BAMA-based styrene-acrylic latexes, and their use in coating compositions, i.e., paints.

In a further preferred embodiment, the latex composition is a hydrophobic core/shell latex where the active wet adhesion monomers, AAEM and t-BAMA, are placed in the shell of the latex particles. The core is preferably comprised of alkenyl aromatic (i.e., styrenic) and acrylic monomers which can be precrosslinked with a multi-functional monomer such as trimethylolpropane triacrylate and the like.

Preferably, the core of the particles has a $T_g$ of about $-28°$ to $25°$ C., and a gel content of about 30% to 74%. Preferably the shell has a $T_g$ of about $-20°$ to about $60°$ C.

Gel content is determined using the method taught in U.S. Pat. No. 5,371,148, incorporated herein by reference. Glass transition temperature $(T_g)$ is a calculated number based on the proportion of each monomer utilized and the corresponding $T_g$ for a homopolymer of such a monomer.

The process of the present invention provides a method for polymerizing a monomer of Formula (1) in the shell of a latex to obtain a polymer which allows the acetoacetoxy group on the compound of Formula (1) to survive for one year as evidenced by the wet adhesion properties of the coatings formed from the compositions of this invention. The process preferably involves charging surfactants to a reactor and feeding in the monomers required for the synthesis of the core of the latex under monomer starved conditions. As used herein, the term "starved-feed" or "monomer starved" refers to a process where a mixture of the monomers and the initiator is fed into the reaction mixture over a period of time. This process results in better compositional control of the copolymers since a high conversion of monomer to polymer is maintained in the reaction vessel. This process also results in better temperature control of the polymerization. The addition rate and process temperature is optimized for the initiator used. The reaction is preferably conducted at $80°$ C. under an inert gas such as nitrogen, and the polymerization is initiated using a free radical initiator such as sodium persulfate. After the monomers required for the synthesis of the core are fed into the reactor, a monomer mixture which defines the shell, comprised of, for example, a surfactant, styrene, butyl acrylate, 2-ethylhexyl 3-mercaptopropionate (to control the molecular weight of the shell), and the wet adhesion monomers of Formulae (1) and (2) is fed into the reactor.

In a preferred aspect of this invention the defined polymers are shear stable. It is known in the art that including small amounts of a carboxylic acid monomer such as methacrylic acid or acrylic acid into the composition of acrylic latexes improves the shear stability of latexes when the latex is neutralized with a base such as ammonia, dimethyl ethanol amine, and the like. Other methods of improving shear stability include the use of charged monomers such as 2-acrylamido-2-methylpropanesulfonate (sodium or ammonium salt) (AMPS, available from Lubrizol Corp.). We have found that although the polymers in the examples below contained no carboxylic monomers or AMPS, they possess excellent shear stability.

It is also preferred that in this process, a chain transfer agent is utilized in a range of about 0.01% to 8% by weight, based on the total solids in the emulsion. Exemplary chain transfer agents are butyl mercaptan, mercaptopropionic acid, 2-ethylhexyl 3-mercaptopropionate, octyl mercaptan, isodecyl mercaptan, octadecyl mercaptan, n-butyl mercaptopropionate, mercaptoacetic acid, and the reactive chain transfer agents taught in U.S. Pat. No. 5,247,040, incorporated herein by reference, in particular allyl mercaptopropionate, allyl mercaptoacetate, crotyl mercaptopropionate, and crotyl mercaptoacetate.

In the above process, suitable initiators, reducing agents, catalysts and surfactants are well-known in the art of emulsion polymerization.

Typical initiators include hydrogen peroxide, potassium or ammonium peroxydisulfate, dibenzoyl peroxide, lauryl peroxide, ditertiary butyl peroxide, 2,2'-azobisisobutyronitrile, t-butyl hydroperoxide, benzoyl peroxide, and the like.

Suitable reducing agents are those which increase the rate of polymerization and include for example, sodium bisulfite, sodium hydrosulfite, sodium formaldehyde sulfoxylate, ascorbic acid, isoascorbic acid, and mixtures thereof.

Suitable catalysts are those compounds which increase the rate of polymerization and which, in combination with the above described reducing agents, promote decomposition of the polymerization initiator under the reaction conditions.

Suitable catalysts include transition metal compounds such as, for example, ferrous sulfate heptahydrate, ferrous chloride, cupric sulfate, cupric chloride, cobalt acetate, cobaltous sulfate, and mixtures thereof.

Suitable surfactants include ionic and nonionic surfactants such as alkyl polyglycol ethers such as ethoxylation products of lauryl, oleyl, and stearyl alcohols; alkyl phenol polyglycol ethers such as ethoxylation products of octyl- or nonylphenol, diisopropyl phenol, triisopropyl phenol; alkali metal ammonium salts of alkyl, aryl or alkylaryl sulfonates, sulfates, phosphates, and the like, including sodium lauryl sulfate, sodium octylphenol glycolether sulfate, sodium dodecylbenzene Sulfonate, sodium lauryldiglycol sulfate, and ammonium tritertiarybutyl phenol and penta- and octaglycol sulfonates, sulfosuccinate salts such as disodium ethoxylated nonylphenol half ester of sulfosuccinic acid, disodium n-octyldecyl sulfosuccinate, sodium dioctyl sulfosuccinate, and the like.

Also, reactive anionic or nonionic surfactants possessing aromatic substituted vinyl, e.g., styrene, or allyl groups may be utilized. Examples include surface active monomers sold by PPG Industries, Inc., as MAZON SAM 181, 183, 184, 211 which are anionic sulfates or sulfonates and MAZON SAM 185–187 which are nonionic. Other reactive surfactants include those sold by Daiichi Kogyo Seiyaku under the name AQUARON. Examples of AQUARON surfactants include compounds of the formulae

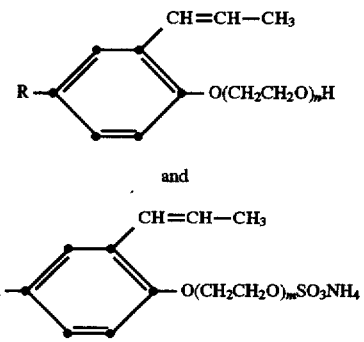

wherein R is nonyl or octyl and n and m are integers of from 1 to 50 and 1 to 10, respectively. Other reactive surfactants include the sodium alkyl allyl sulfosuccinate sold by Henkel, under the name TREM LF-40. Further examples of such surfactants can be found in U.S. Pat. Nos. 5,185,212; 2,600,831; 2,271,622; 2,271,623; 2,275,727; 2,787,604; 2,816,920; and 2,739,891, incorporated herein by reference.

In the above emulsions, the polymer preferably exists as a generally spherical particle, dispersed in water.

Thus, as a further aspect of the present invention, there is provided a generally spherical polymeric particle having a diameter of about 35 nm to about 350 nm, a core portion comprised of about 50% to about 80% of the total weight of said particle, said core portion having a $T_g$ of about $-28°$ to $25°$ C., and a gel content of about 30 to 74 percent, and a shell portion comprised of about 50% to about 20% of the total weight of said particle, said shell portion having a $T_g$ of about $-20°$ C. to $60°$ C., wherein said particle is comprised of a polymer prepared by the free-radical polymerization of ethylenically unsaturated monomers comprised of (a) from about 0.5 to about 25 weight percent of a compound of Formula (1)

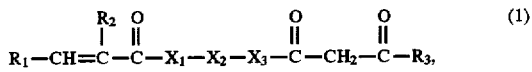

wherein $R_1$ is hydrogen or halo; $R_2$ is hydrogen, halo, $C_1$–$C_6$ alkylthio, or $C_1$–$C_6$alkyl; $R_3$ is $C_1$–$C_6$ alkyl; $X_1$ and $X_3$ are independently O, S, or a group of the formula —NR′, wherein R′ is hydrogen or $C_1$–$C_6$ alkyl; and $X_2$ is $C_1$–$C_{12}$ straight or branched alkylene or $C_3$–$C_{12}$ cycloalkylene;

(b) from about 0.5 to about 25 weight percent of a compound of Formula (2),

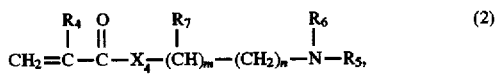

wherein $R_4$ is hydrogen or $C_1$–$C_6$ alkyl, $R_5$ is $C_1$–$C_6$ alkyl, $R_6$ is hydrogen or $C_1$–$C_6$ alkyl, $R_7$ is hydrogen or $C_1$–$C_6$ alkyl, m is an integer of from 1 to 4, n is an integer of from 1 to 4, and n+m is greater than or equal to 2, and $X_4$ is O, S, or a group of the formula —NR′, wherein R′ is hydrogen or $C_1$–$C_6$ alkyl; and (c) ethylenically unsaturated monomers of a structure other than Formula (1) or (2), the total mole percent of (a), (b), and (c) being 100 percent;

wherein in said particle, the core is substantially derived from the polymerization of ethylenically unsaturated monomers of a structure other than Formula (1) or (2), and the shell is derived from the polymerization of monomers of Formula (1), monomers of Formula (2), and other ethylenically unsaturated monomers.

In this regard, the core is preferably derived from abut 90 to 100% of monomers of a formula other than Formula (1) or (2), and the shell is preferably derived from about 10 to about 70 weight percent of monomers of Formula (1) or (2).

As a further aspect of the present invention there is provided a latex coating composition comprising the polymers of the present invention as described herein, further comprising one or more leveling, rheology, and flow control agents such as silicones, fluorocarbons or cellulosics; neutralized carboxylic acid-containing latex particles with highly crosslinked particles; associative thickeners; flatting agents; pigment wetting and dispersing agents and surfactants; ultraviolet (UV) absorbers; UV light stabilizers; tinting pigments; defoaming and antifoaming agents; anti-settling, anti-sag and bodying agents; anti-skinning agents; anti-flooding and anti-floating agents; fungicides and mildewcides; corrosion inhibitors; thickening agents; or coalescing agents.

Specific examples of such additives can be found in *Raw Materials Index*, published by the National Paint & Coatings Association, 1500 Rhode Island Avenue, N.W., Washington, D.C. 20005. Further examples of such additives and emulsion polymerization methodology may be found in U.S. Pat. No. 5,371,148, incorporated herein by reference.

Examples of flatting agents include synthetic silica, available from the Davison Chemical Division of W. R. Grace & Company under the trademark SYLOID®; polypropylene, available from Hercules Inc., under the trademark HERCOFLAT®; synthetic silicate, available from J. M. Huber Corporation under the trademark ZEOLEX®.

Examples of dispersing agents and surfactants include sodium bis(tridecyl) sulfosuccinnate, di(2-ethyl hexyl) sodium sulfosuccinnate, sodium dihexylsulfosuccinnate, sodium dicyclohexyl sulfosuccinnate, diamyl sodium sulfosuccinnate, sodium diisobutyl sulfosuccinnate, disodium iso-decyl sulfosuccinnate, disodium ethoxylated alcohol half ester of sulfosuccinnic acid, disodium alkyl amido polyethoxy sulfosuccinnate, tetrasodium N-(1,2-dicarboxyethyl)-N-octadecyl sulfosuccinnamate, disodium N-octasulfosuccinnamate, sulfated ethoxylated nonylphenol, 2-amino-2-methyl-1-propanol, and the like.

Examples of viscosity, suspension, and flow control agents include polyaminoamide phosphate, high molecular weight carboxylic acid salts of polyamine amides, and alkylene amine salts of an unsaturated fatty acid, all available from BYK Chemie U.S.A. under the trademark ANTI TERRA®. Further examples include polysiloxane copolymers, polyacrylate solution, cellulose esters, hydroxyethyl cellulose, hydrophobically-modified hydroxyethyl cellulose, hydroxypropyl cellulose, polyamide wax, polyolefin wax, carboxymethyl cellulose, ammonium polyacrylate, sodium polyacrylate, and polyethylene oxide. Other examples of thickeners includes the methane/ethylene oxide associative thickeners and water soluble carboxylated thickeners, for example, those sold under the UCAR POLYPHOBE trademark by Union Carbide.

Several proprietary antifoaming agents are commercially available,for example, under the trademark BRUBREAK of Buckman Laboratories Inc., under the BYK® trademark of BYK Chemie, U.S.A., under the FOAMASTER® and NOPCO® trademark of Henkel Corp./Coating Chemicals, under the DREWPLUS® trademark of the Drew Industrial Division of Ashland Chemical Company, under the TROYSOL® and TROYKYD® trademarks of Troy Chemical Corporation, and under the SAG® trademark of Union Carbide Corporation.

Examples of fungicides, mildewcides, and biocides include 4,4-dimethyloxazolidine, 3,4,4-trimethyloxazolidine, modified barium metaborate, potassium N-hydroxy-methyl-N-methyldithiocarbamate, 2-(thiocyanomethylthio) benzothiazole, potassium dimethyl dithiocarbamate, adamantane, N-(trichloromethylthio) phthalimide, 2,4,5,6-tetrachloroisophthalonitrile, orthophenyl phenol, 2,4,5-trichlorophenol, dehydroacetic acid, copper naphthenate, copper octoate, organic arsenic, tributyl tin oxide, zinc naphthenate, and copper 8-quinolinate.

Examples of U.V. absorbers and U.V. light stabilizers include substituted benzophenone, substituted benzotriazoles, hindered amines, and hindered benzoates, available from American Cyanamide Company under the trademark CYASORB UV, and diethyl-3-acetyl-4-hydroxybenzyl-phosphonate, 4-dodecyloxy-2-hydroxy benzophenone, and resorcinol monobenzoate.

Such paint or coating additives as described above form a relatively minor proportion of the coating composition, preferably about 0.05 weight % to about 5.00 weight %.

As a further aspect of the present invention, there is provided a coating composition optionally containing one or more of the above-described additives. It may also be desirable to utilize a water-miscible organic solvent. Such solvents are well known and include ethanol, n-propanol, isopropanol, n-butanol, sec-butanol, isobutanol, ethylene glycol monobutyl ether, propylene glycol n-butyl ether, propylene glycol methyl ether, propylene glycol monopropyl ether, dipropylene glycol methyl ether, diacetone alcohol, Eastman Chemical Company's TEXANOL® ester alcohol, and other water-miscible solvents.

(See, for example, J. K. Backus in "High Polymers, Vol. 29, 1977, p. 642–680).

As a further aspect of the present invention, there is provided a coating composition as set forth above, further comprising one or more pigments and/or fillers in a concentration of about 1 to about 70 weight percent, preferably about 30 to about 60 weight percent, based on the total weight of the components of the composition.

Pigments suitable for use in the coating compositions envisioned by the present invention are the typical organic and inorganic pigments, well-known to one of ordinary skill in the art of surface coatings, especially those set forth by the *Colour Index*, 3d Ed., 2d Rev., 1982, published by the Society of Dyers and Colourists in association with the American Association of Textile Chemists and Colorists. Examples include, but are not limited to the following: CI Pigment White 6 (titanium dioxide); CI Pigment Red 101 (red iron Oxide); CI Pigment Yellow 42, CI Pigment Blue 15, 15:1, 15:2, 15:3, 15:4 (copper phthalocyanines); CI Pigment Red 49:1; and CI Pigment Red 57:1.

Upon formulation above, the coating compositions is then applied to the desired substrate or article, e.g., steel, aluminum, or galvanized sheeting (either primed or unprimed), and allowed to air dry. Any coating composition designed for industrial coatings, textile coatings, ink coatings, adhesives, or coatings for plastics are within the scope of the present invention and is included in the term "article". Thus, as a further aspect of the present invention, there is provided a shaped or formed article which has been coated with the coating compositions of the present invention and dried.

EXPERIMENTAL SECTION

Raw Materials

AEROSOL-OT, sodium dioctyl sulfosuccinate, is an anionic surfactant sold by American Cyanamide Company.

TERGITOL NP-40 (70% in water) is a nonyl phenol-based nonionic surfactant sold by Union Carbide Corporation.

Methyl methacrylate, styrene, n-butyl acrylate were purchased from Aldrich.

Trimethylolpropane triacrylate is a tri-functional acrylate sold by Polysciences.

Acetoacetoxyethyl Methacrylate (AAEM) is a monomer sold by Eastman Chemical Company.

2-Ethylhexyl mercaptoproprionate is a mercaptan sold by Phillips Petroleum Company.

Propylene Glycol and TEXANOL ester alcohol are sold by Eastman Chemical Company.

TAMOL 1124 is a dispersant sold by Rohm & Haas Company.

RHOPLEX ML—200 is an acrylic latex sold by Rohm & Haas Company.

ACRYSOL RM—5 is a rheology modifier (thickener) sold by Rohm & Haas Company.

FOAMASTER AP is a defoamer sold by Henkel.

Ti-Pure R-900 is Titanium Dioxide sold by Dupont.

Burgess #98 is a fine particle size clay sold by Burgess Pigment.

TIOXIDE R-HD6X is Titanium Dioxide sold by Tioxide.

2-Acrylamido-2-methylpropanesulfonate, sodium salt (AMPS) is sold by Lubrizol, 29400 Lakeland Blvd., Wickliffe, Ohio 44902.

EXAMPLE 1

| Gross Composition | Molecular Weight | Weight Percent | Grams |
|---|---|---|---|
| Synthesis of a Latex with Wet Adhesion | | | |
| Methyl Methacrylate | 100.12 | 33.92 | 121.14 |
| Styrene | 104.15 | 20.00 | 71.43 |
| n-Butyl Acrylate | 128.17 | 38.00 | 135.71 |
| t-Butyl Aminoethyl Methacrylate | 185.2 | 2.0 | 7.14 |
| n-Butyl Acrylate | 128.17 | 2.52 | 9.00 |
| 2-Ethylhexyl mercaptopropionate | 217.35 | 1.41 | 5.0355 |
| AAEM | 214.35 | 2.00 | 7.14 |
| Trimethylolpropane Triacrylate (TMPTA) | | 0.15 | 0.5357 |
| FEED ONE (Latex Core) | | | |
| Methyl Methacrylate | 100.12 | 45.8 | 121.14 |
| n-Butyl Acrylate | 128.17 | 43.19 | 114.25 |
| TMPTA | | 0.2 | 0.5357 |
| Styrene | 104.15 | 10.81 | 28.6 |
| AEROSOL OT-75 | | | 1.0 |
| FEED TWO (Latex Shell, 28% of Monomer Composition) | | | |
| n-Butyl Acrylate | 128.17 | 32.89 | 30.46 |
| Styrene | 104.15 | 46.25 | 42.83 |
| AEROSOL OT-75 | | | 3.0 |
| 2-Ethylhexyl mercaptopropionate | 217.35 | 5.44 | 5.04 |
| t-Butyl Aminoethyl Methacrylate | 185.2 | 7.71 | 7.14 |
| AAEM | 214.35 | 7.71 | 7.14 |

To a resin kettle were charged 392.8 g of deionized water, 0.76 g of AEROSOL OT-75, 3.0 g of sodium carbonate and 0.89 g of NP-40 (100%). A nitrogen purge was begun then the contents of the kettle brought up to 80° C. at 400 rpm. After reaching 80° C., 2.0 g of sodium persulfate dissolved in 53 g of deionized water was added to the reaction kettle and temperature maintained at 80° C. Monomer Feed 1 was fed over 140 minutes. After addition of Monomer Feed 1 was completed, then Monomer Feed 2 was added to the feed tank and the feed continued at the same rate. The total feed time for Feeds 1 and 2 together was 170 minutes. After the monomer feeds were in, the latex was maintained at 80° C. for an additional 15 minutes, then cooled to room temperature. Solids, 44%; Filterable solids, 0.03 grams (100 mesh screen).

Latex recipes for Examples 2 and 3 in Table 1 below were similar to Example 1 except that for Example 2 butyl acrylate was substituted for the t-BAMA, and in Example 3, butyl acrylate was substituted for the AAEM.

EXAMPLE 4

| Gross Composition | Molecular Weight | Weight Percent | Grams |
|---|---|---|---|
| Synthesis of a Latex with Wet Adhesion | | | |
| Methyl Methacrylate | 100.12 | 33.92 | 121.14 |
| Styrene | 104.15 | 20.00 | 71.43 |
| n-Butyl Acrylate | 128.17 | 41.67 | 148.85 |
| t-Butylaminoethyl Methacrylate | 185.2 | 2.0 | 7.14 |
| 2-Ethylhexyl mercaptopropionate | 217.35 | 0.25 | 0.893 |
| AAEM | 214.35 | 2.00 | 7.14 |
| Trimethylolpropane Triacrylate (TMPTA) | | 0.15 | 0.5357 |

-continued

| Gross Composition | Molecular Weight | Weight Percent | Grams |
|---|---|---|---|
| FEED ONE (Latex Core) | | | |
| Methyl Methacrylate | 100.12 | 45.8 | 121.14 |
| n-Butyl Acrylate | 128.17 | 43.19 | 114.25 |
| TMPTA | | 0.2 | 0.5357 |
| Styrene | 104.15 | 10.81 | 28.6 |
| AEROSOL OT-75 | | | 1.0 |
| FEED TWO (Latex Shell, 28% of Monomer Composition) | | | |
| n-Butyl Acrylate | 128.17 | 37.4 | 34.6 |
| Styrene | 104.15 | 46.25 | 42.83 |
| AEROSOL OT-75 | | | 3.0 |
| 2-Ethylhexyl mercaptopropionate | 217.35 | 0.964 | 0.893 |
| t-Butylaminoethyl Methacrylate | 185.2 | 7.71 | 7.14 |
| AAEM | 214.35 | 7.71 | 7.14 |

To a resin kettle were charged 392.8 g of deionized water, 0.76 g of AEROSOL OT-75, 3.0 g of sodium carbonate and 0.89 g of NP-40 (100%). A nitrogen purge was begun then the contents of the kettle brought up to 80° C. at 400 rpm. After reaching 80° C., 2.0 g of sodium persulfate dissolved in 53 g of deionized water was added to the reaction kettle and temperature maintained at 80° C. Monomer Feed 1 was fed over 140 minutes. After addition of Monomer Feed 1 was completed, then Monomer Feed 2 was added to the feed tank and the feed continued at the same rate. The total feed time for Feeds 1 and 2 together was 170 minutes. After the monomer feeds were in, the latex was maintained at 80° C. for an additional 15 minutes, then cooled to room temperature. Solids, 45%; Filterable solids, 0.01 grams (100 mesh screen).

Latex recipes for Examples 5 in Table 1 below were similar to Example 4 except that for Example 5 dimethylaminoethyl methacrylate was substituted for the t-BAMA.

TABLE 1

| Ex. | Latex Solids | Filterable Solids (grams) | Percent of AAEM in Latex | Percent of tBAMA in Latex | Percent of Dimethyl-Aminoethyl Methacrylate in Latex |
|---|---|---|---|---|---|
| 1 | 44 | 0.03 | 2 | 2 | 0 |
| 2 | 43 | 0.00 | 2 | 0 | 0 |
| 3 | 45 | 0.00 | 0 | 2 | 0 |
| 4 | 45 | 0.01 | 2 | 2 | 0 |
| 5 | 44 | 0.00 | 2 | 0 | 2 |

EXAMPLE 6

Preparation of Formulations for Wet Adhesion Studies

| Ingredients | Pounds | Gallons |
|---|---|---|
| GRIND: | | |
| Propylene Glycol | 70.0 | 8.08 |
| TAMOL 1124 | 8.4 | 0.85 |
| FOAMASTER AP | 1.0 | 0.13 |
| Water | 48.3 | 5.8 |

Preparation of Formulations for Wet Adhesion Studies

| Ingredients | Pounds | Gallons |
|---|---|---|
| Ti-Pure R-900 | 210.0 | 6.3 |
| BURGESS #98 | 90.0 | 4.1 |
| Total | 427.7 | 25.26 |
| LET DOWN: | | |
| Water | 70.8 | 8.5 |
| TEXANOL ester alcohol | 11.4 | 1.4 |
| Latex (ML-200) | 424.1 | 48.27 |
| FOAMASTER AP | 3.0 | 0.4 |
| Water | 42.0 | 5.04 |
| Ammonia (28%) | 1.8 | 0.23 |
| ACRYLSOL RM-5 | 30.0 | 3.41 |
| Water | 52.5 | 6.29 |
| Ammonia (28%) | 8.3 | 1.08 |
| TOTALS | 1071.6 | 99.92 |

The propylene glycol, TAMOL 1124, FOAMASTER AP, and water were added to an appropriate container and placed under a high speed mixer with variable speed controller. The TI-PURE R-900 was weighed out and slowly added into the above mixture under agitation. The agitation was controlled to minimize foam while maintaining good mixing. The Burgess #98 was weighed out and also added slowly. Once all these ingredients were in, the mixture was ground at high speed for at least 20 minutes.

The letdown portion of this formulation was done under slow agitation. This can be accomplished with the same mixer or it can be transferred to a variable speed mixer with a three bladed paddle. The letdown ingredients were added in the order shown, slowly, while maintaining a vortex by controlling the mixer. Once all the ingredients are in, mixing was continued for about ten minutes. Paint should be kept covered and allowed to equilibrate over night before testing film properties.

The above formulation was used as a control and the experimental latexes were substituted for the RHOPLEX ML-200 on an equal volume solids basis. Some adjustments were made in the amount of water and thickener used so the Pigment Volume Concentration and the storage viscosity would remain near constant.

The latexes prepared were tested for wet adhesion using one of the several tests used in the paint industry for measuring wet adhesion. This procedure is described in "VYNATE™ (Union Carbide Chemicals and Plastics Corporation)—Vinyl Emulsion Vehicles for Semigloss Interior Architectural Coatings", M. J. Collins, et. al., presented at the 19th Annual "Water-Borne High-Solids and Powder Coating Symposium", Feb. 26–28, 1992, New Orleans, La., U.S.A.

A ten-mil drawdown of a commercial gloss alkyd paint is made on a "Leneta" scrub panel. (Adhesion varies from alkyd to alkyd. A Glidden Industrial Enamel was used.) The alkyd film is allowed to age one week at ambient conditions, then baked at 110° F. for 24 hours, and then aged at least one more week at ambient conditions. A seven-mil drawdown of the test paint is then made over the aged alkyd and allowed to air dry three days. (In order to differentiate between samples that pass this test, dry times may be shortened. Seven days is a common period, and occasionally 5 hours dry time is used. Constant temperature/humidity conditions, 72° F./50%, are normally used for drying.) The test paint is then cross-hatched with a razor and submerged in water for 30 minutes. The paint film is inspected for blistering and scratched with the fingernail to gauge the adhesion. While still wet, the panel is placed on a "Gardner" scrub machine. Ten mL of five percent "LAVA™" soap slurry are added, and the Nylon scrub brush (WG 2000NB) is passed over the scored paint film area. Water is added as needed to keep the paint film wet (flooded). The number of brushing cycles for initial peel and ten percent peel are noted. The number of cycles for complete removal of the film is often noted also.

All latexes from Examples 1 through 5 were formulated into paints using the procedure described for the Rohm and Haas Latex, RHOPLEX ML-200 in Rohm and Haas Publication No. RHOPLEX AC 264 Formulation SG-264-7 (Example 6).

TABLE 2

| Wet Adhesion of paints prepared from latexes Examples | Number of Double Scrubs 10% Failure (5 hr. dry) | Number of Double Scrubs 10% Failure (1 day dry) | Number of Double Scrubs 10% Failure (3 day dry) |
|---|---|---|---|
| 1 | >3000 | >3000 | >3000 |
| 2 | 0 | 120 | 270 |
| 3 | 1100 | <700 | 1000 |
| 4 | >3000 | >3000 | |
| 5 | 800 | >3000 | |
| 7 | 950 | >3000 | >3000 |

Example 7 uses RHOPLEX ML200 instead of the experimental latex.

EXAMPLE 8

Evaluation of a Paint Prepared from Example 1 After One Year

The paint from Example 1 was aged for one year at room temperature. After one year storage the samples were applied to aged alkyd substrate and tested for wet adhesion. The results indicated wet adhesion to the levels described in Table 2.

We claim:

1. A polymer prepared by the free-radical polymerization of ethylenically unsaturated monomers comprised of (a) from about 0.5 to about 25 weight percent of a compound of Formula (1)

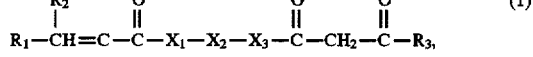

wherein $R_1$ is hydrogen or halo; $R_2$ is hydrogen, halo, $C_1$–$C_6$ alkylthio, or $C_1$–$C_6$ alkyl; $R_3$ is $C_1$–$C_6$ alkyl; $X_1$ and $X_3$ are independently O, S, or a group of the formula —NR', wherein R' is hydrogen or $C_1$–$C_6$ alkyl; and $X_2$ is $C_1$–$C_{12}$ straight or branched alkylene or $C_3$–$C_{12}$ cycloalkylene;

(b) from about 0.5 to about 25 weight percent of a compound of Formula (2),

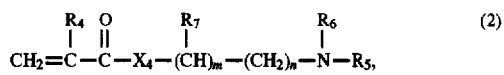

wherein $R_4$ is hydrogen or $C_1$–$C_6$ alkyl, $R_5$ is $C_1$–$C_6$ alkyl, $R_6$ is hydrogen or $C_1$–$C_6$ alkyl, $R_7$ is hydrogen or $C_1$–$C_6$ alkyl, m is an integer of from 1 to 4, n is an integer of from 1 to 4, and n+m is greater than or equal to 2, and $X_4$ is O, S, or a group of the formula —NR', wherein R' is hydrogen or $C_1$–$C_6$ alkyl; and (c) any remaining monomers selected from the group consisting of styrene; hydroxyethyl acrylate; hydroxyethyl methacrylate; isobornyl acrylate; isobornyl methacrylate; multifunctional acrylates or multifunctional methacrylates providing gel content of about 30% to 74%; and acrylic or crotonic compounds the of formula

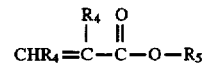

wherein $R_4$ is independently hydrogen or methyl and $R_5$ is $C_1$–$C_{12}$ alkyl; the total weight percent of (a), (b), and (c) being 100 percent.

2. The polymer of claim 1, wherein said polymer, when applied to a substrate, exhibits wet adhesion within three days.

3. The polymer of claim 1, wherein the compound of Formula (1) is selected from the group consisting of acetoacetoxyethyl methacrylate, acetoacetoxyethyl acrylate, acetoacetoxypropyl methacrylate, acetoacetoxypropyl acrylate, acetoacetoxybutyl acrylate, and aceotacetoxy (methyl)ethyl acrylate.

4. The polymer of claim 1, wherein the compound of Formula (2) is selected from the group consisting of t-butylaminoethyl methacrylate, N,N-dimethylaminoethyl methacrylate, N,N-dimethylaminopropyl methacrylamide, 2-t-butylaminoethyl methacrylate, N,N-dimethylaminoethyl acrylate, N-methyl-N-ethylaminoethyl acrylate, N,N-diethylaminoethyl acrylate, and N,N-dipropylaminoethyl acrylate.

5. The polymer of claim 2, wherein the ethylenically unsaturated monomers are selected from the group consisting of butyl acrylate, methyl methacrylate, 2-ethylhexyl acrylate, butyl methacrylate, isobornyl methacrylate, ethyl acrylate, hydroxyethyl methacrylate, hydroxyethyl acrylate, ethyl methacrylate, lauryl methacrylate, and trimethylolpropane triacrylate.

6. The polymer of claim 1, wherein the compound of Formula (1) is used in a range of 1 to 4 weight percent and the compound of Formula (2) is used in a range of 1 to 4 weight percent.

7. The polymer of claim 6, wherein the compound of Formula (1) is

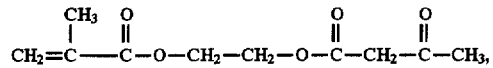

and the compound of Formula (2) is t-butylaminoethyl methacrylate or N,N-dimethylaminoethyl methacrylate.

8. The polymer of claim 7, wherein the ethylenically unsaturated monomers are selected from the group consisting of styrene, butyl acrylate, methyl methacrylate and 2-ethylhexyl acrylate, hydroxyethyl methacrylate, and trimethylolpropane triacrylate.

9. A coating composition comprising water and a polymer prepared by the free-radical polymerization of ethylenically unsaturated monomers comprised of (a) from about 0.5 to about 25 weight percent of a compound of Formula (1)

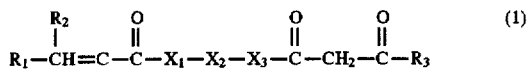

wherein $R_1$ is hydrogen or halo; $R_2$ is hydrogen, halo, $C_1$–$C_6$ alkylthio, or $C_1$–$C_6$ alkyl; $R_3$ is $C_1$–$C_6$ alkyl; $X_1$ and $X_3$ are independently O, S, or a group of the formula —NR', wherein R' is hydrogen or $C_1$–$C_6$ alkyl; and $X_2$ is $C_1$–$C_{12}$ straight or branched alkylene or $C_3$–$C_{12}$ cycloalkylene;

(b) from about 0.5 to about 25 weight percent of a compound of Formula (2),

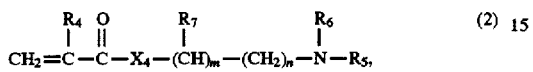

where $R_4$ is hydrogen or $C_1$–$C_6$ alkyl, $R_5$ is $C_1$–$C_6$ alkyl, $R_6$ is hydrogen or $C_1$–$C_6$ alkyl, $R_7$ is hydrogen or $C_1$–$C_6$ alkyl, m is an integer of from 1 to 4, n is an integer of from 1 to 4, and n+m is greater than or equal to 2, and $X_4$ is O, S, or a group of the formula —NR', wherein R' is hydrogen or $C_1$–$C_6$ alkyl; and (c) any remaining monomers selected from the group consisting of styrene; hydroxyethyl acrylate; hydroxyethyl methacrylate; isobornyl acrylate; isobornyl methacrylate; multifunctional acrylate or multifunctional methacrylates providing a gel content of about 30% to 74%; and acrylic or crotonic compounds the of formula

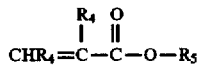

wherein $R_4$ is independently hydrogen or methyl and $R_5$ is $C_1$–$C_{12}$ alkyl; the total weight percent of (a), (b), and (c) being 100 percent.

10. The coating composition of claim 9, wherein the compound of Formula (1) is

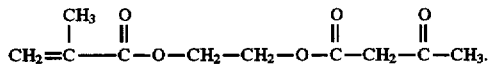

11. The coating composition of claim 9, wherein the compound of Formula (2) is selected from the group consisting of t-butylaminoethyl methacrylate, N,N-dimethylaminoethyl methacrylate, N,N-dimethylaminopropyl methacrylamide, 2-t-butylaminoethyl methacrylate, N,N-dimethylaminoethyl acrylate, N-methyl-N-ethyl-aminoethyl acrylate, N,N-diethylaminoethyl acrylate, and N,N-dipropylaminoethyl acrylate.

12. The coating composition of claim 9, wherein the ethylenically unsaturated compounds are selected from the group consisting of butyl acrylate, methyl methacrylate, 2-ethylhexyl acrylate, butyl methacrylate, isobornyl methacrylate, ethyl acrylate, hydroxyethyl methacrylate, hydroxyethyl acrylate, ethyl methacrylate, lauryl methacrylate, and trimethylolpropane triacrylate.

13. The coating composition of claim 9, wherein the compound of Formula (1) is used in a range of 1 to 4 weight percent and the compound of Formula (2) is used in a range of 1 to 4 weight percent.

14. The coating composition of claim 13, wherein the compound of Formula (1) is

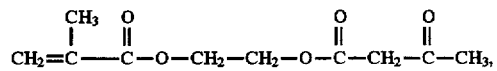

and the compound of Formula (2) is t-butylaminoethyl methacrylate or N,N-dimethylaminoethyl methacrylate.

15. The coating composition of claim 14, wherein the ethylenically unsaturated monomers are selected from the group consisting of styrene, butyl acrylate, methyl methacrylate and 2-ethylhexyl acrylate, hydroxyethyl methacrylate, and trimethylolpropane triacrylate.

16. The coating composition of claim 9, further comprising one or more fillers and/or pigments.

17. An article coated with a polymer prepared by the free-radical polymerization of ethylenically unsaturated monomers comprised of (a) from about 0.5 to about 25 weight percent of a compound of Formula (1)

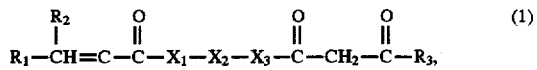

wherein $R_1$ is hydrogen or halo; $R_2$ is hydrogen, halo, $C_1$–$C_6$ alkylthio, or $C_1$–$C_6$ alkyl; $R_3$ is $C_1$–$C_6$ alkyl; $X_1$ and $X_3$ are independently O, S, or a group of the formula —NR', wherein R' is hydrogen or $C_1$–$C_6$ alkyl; and $X_2$ is $C_1$–$C_{12}$ straight or branched alkylene or $C_3$–$C_{12}$ cycloalkylene;

(b) from about 0.5 to about 25 weight percent of a compound of Formula (2),

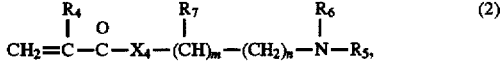

wherein $R_4$ is hydrogen or $C_1$–$C_6$ alkyl, $R_5$ is $C_1$–$C_6$ alkyl, $R_6$ is hydrogen or $C_1$–$C_6$ alkyl, $R_7$ is hydrogen or $C_1$–$C_6$ alkyl, m is an integer of from 1 to 4, n is an integer of from 1 to 4, and n+m is greater than or equal to 2, and $X_4$ is O, S, or a group of the formula —NR', wherein R' is hydrogen or $C_1$–$C_6$ alkyl; and (c) any remaining monomers selected from the group consisting of styrene; hydroxyethyl acrylate; hydroxyethyl methacrylate; isobornyl acrylate; isobornyl methacrylate; multifunctional acrylates or multifunctional methacrylates providing a gel content of about 30% to 74%; and acrylic or crotonic compounds the of formula

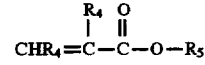

wherein $R_4$ is independently hydrogen or methyl and $R_5$ is $C_1$–$C_{12}$ alkyl; the total weight percent of (a), (b), and (c) being 100 percent.

18. The article of claim 17, wherein the compound of Formula (1) is

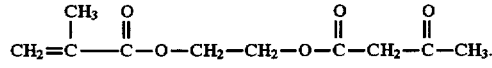

19. The article of claim 17, wherein the compound of Formula (2) is selected from the group consisting of t-butylaminoethyl methacrylate, N,N-dimethylaminoethyl methacrylate, N,N-dimethylaminopropyl methacrylamide, 2-t-butylaminoethyl methacrylate, N,N-dimethylaminoethyl acrylate, N-methyl-N-ethylaminoethyl acrylate, N,N-diethylaminoethyl acrylate, and N,N-dipropylaminoethyl acrylate.

20. The article of claim 17, wherein the ethylenically unsaturated compounds are selected from the group consisting of butyl acrylate, methyl methacrylate, 2-ethylhexyl acrylate, butyl methacrylate, isobornyl methacrylate, ethyl acrylate, hydroxyethyl methacrylate, hydroxyethyl acrylate, ethyl methacrylate, lauryl methacrylate, and trimethylolpropane triacrylate.

21. The article of claim 17, wherein the compound of Formula (1) is used in a range of 1 to 4 weight percent and the compound of Formula (2) is used in a range of 1 to 4 weight percent.

22. The article of claim 17, wherein the compound of Formula (1) is

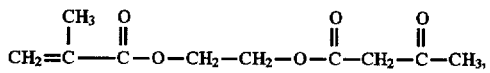

and the compound of Formula (2) is t-butylaminoethyl methacrylate or N,N-dimethylaminoethyl methacrylate.

23. The article of claim 22, wherein the ethylenically unsaturated monomers are selected from the group consisting of styrene, butyl acrylate, methyl methacrylate and 2-ethylhexyl acrylate, hydroxyethyl methacrylate, and trimethylolpropane triacrylate.

24. The article of claim 17, wherein said article is selected from the group consisting of wood, wood by-products, gypsum board, metal, plastic, concrete, and masonry.

25. The article of claim 14, wherein said article is a textile product.

26. A generally spherical polymeric particle having a diameter of about 35 nm to about 350 nm, a core portion comprised of about 20% to about 80% of the total weight of said particle, said core portion having a $T_g$ of about $-28°$ to $25°$ C., and a gel content of about 30 to 74 percent, and a shell portion comprised of about 80% to about 20% of the total weight of said particle, said shell portion having a $T_g$ of about $-20°$ to $60°$ C., wherein said particle is comprised of a polymer prepared by the free-radical polymerization of ethylenically unsaturated monomers comprised of (a) from about 0.5 to about 25 weight percent of a compound of Formula (1)

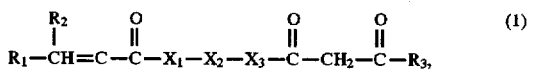 (1)

wherein $R_1$ is hydrogen or halo; $R_2$ is hydrogen, halo, $C_1$-$C_6$ alkylthio, or $C_1$-$C_6$ alkyl; $R_3$ is $C_1$-$C_6$ alkyl; $X_1$ and $X_3$ are independently O, S, or a group of the formula —NR', wherein R' is hydrogen or $C_1$-$C_6$ alkyl; and $X_2$ is $C_1$-$C_{12}$ straight or branched alkylene or $C_3$-$C_{12}$ cycloalkylene;

(b) from about 0.5 to about 25 weight percent of a compound of Formula (2),

 (2)

wherein $R_4$ is hydrogen or $C_1$-$C_6$ alkyl, $R_5$ is $C_1$-$C_6$ alkyl, $R_6$ is hydrogen or $C_1$-$C_6$ alkyl, $R_7$ is hydrogen or $C_1$-$C_6$ alkyl, m is an integer of from 1 to 4, n is an integer of from 1 to 4, and n+m is greater than or equal to 2, and $X_4$ is O, S, or a group of the formula —NR', wherein R' is hydrogen or $C_1$-$C_6$ alkyl; and (c) ethylenically unsaturated monomers selected from the group consisting of styrene; hydroxyethyl acrylate; hydroxyethyl methacrylate; isobornyl acrylate; isobornyl methacrylate; multifunctional acrylates or multifunctional methacrylates providing a gel content of about 30% to 74%; and acrylic or crotonic compounds the of formula

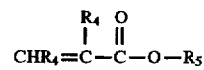

wherein $R_4$ is independently hydrogen or methyl and $R_5$ is $C_1$-$C_{12}$ alkyl; the total weight percent of (a), (b), and (c) being 100 percent;

wherein in said particle, the core is substantially derived from the polymerization of ethylenically unsaturated monomers of a structure other than Formula (1) or (2), and the shell is derived from the polymerization of monomers of Formula (1), monomers of Formula (2), and said other ethylenically unsaturated monomers.

27. The particle of claim 26, wherein the compound of Formula (1) is

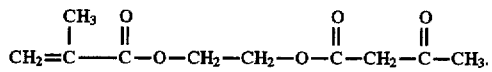

28. The particle of claim 26, wherein the compounds of Formula (2) are selected from the group consisting of t-butylaminoethyl methacrylate, dimethylaminoethyl methacrylate, N-dimethylaminopropyl methacrylamide, 2-t-butylaminoethyl methacrylate, and N,N-dimethylaminoethyl acrylate.

29. The particle of claim 26, wherein the ethylenically unsaturated compounds are selected from the group consisting of butyl acrylate, methyl methacrylate, 2-ethylhexyl acrylate, butyl methacrylate, isobornyl methacrylate, ethyl acrylate, hydroxyethyl methacrylate, hydroxyethyl acrylate, ethyl methacrylate, lauryl methacrylate, and trimethylolpropane triacrylate.

30. The particle of claim 26, wherein the compound of Formula (1) is used in a range of 1 to 4 weight percent and the compound of Formula (2) is used in a range of 1 to 4 weight percent.

31. The particle of claim 26, wherein the compound of Formula (1) is

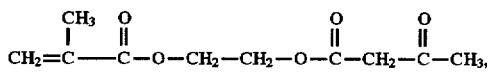

and the compound of Formula (2) is t-butylaminoethyl methacrylate or N,N-dimethylaminoethyl methacrylate.

32. The particle of claim 31, wherein the ethylenically unsaturated monomers are selected from the group consisting of styrene, butyl acrylate, and methyl methacrylate.

33. The particle of claim 26, wherein the core is derived from about 90 to 100% of monomers of a formula other than Formula (1) or (2), and the shell is derived from about 10 to 70 weight percent of monomers Formula (1) and (2).

* * * * *